April 30, 1957 — B. SILVERSTEIN — 2,790,240
DRAFTING INSTRUMENT
Filed Feb. 12, 1954 — 3 Sheets-Sheet 2
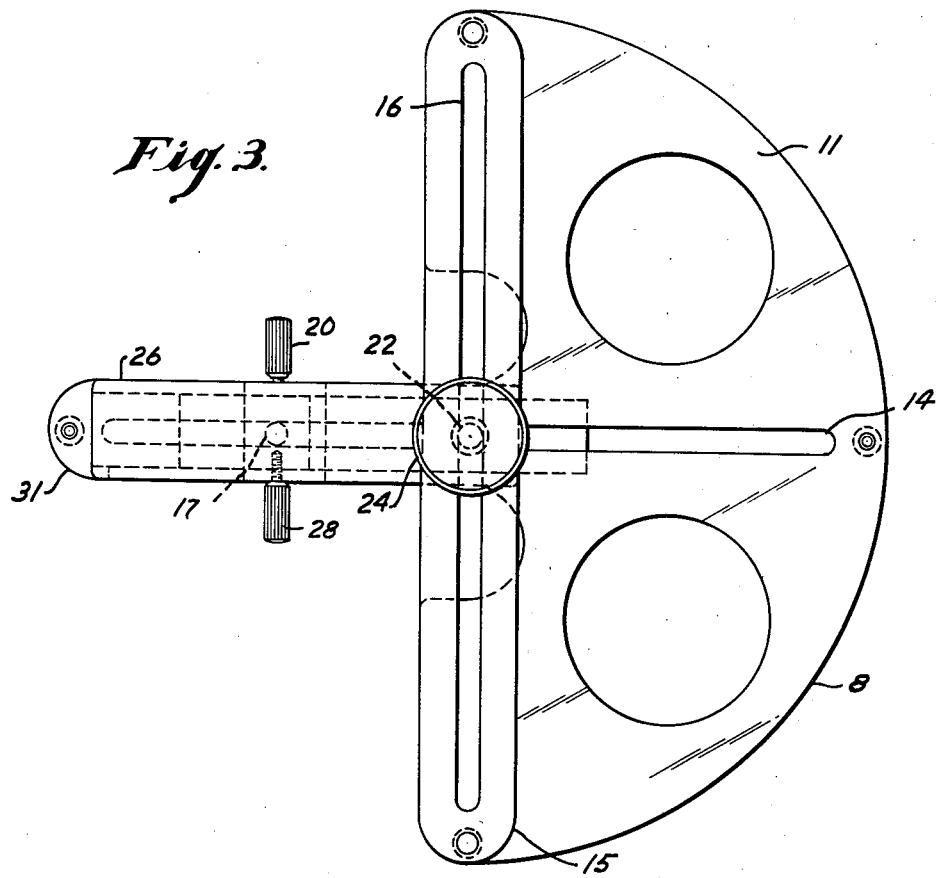
Fig. 3.
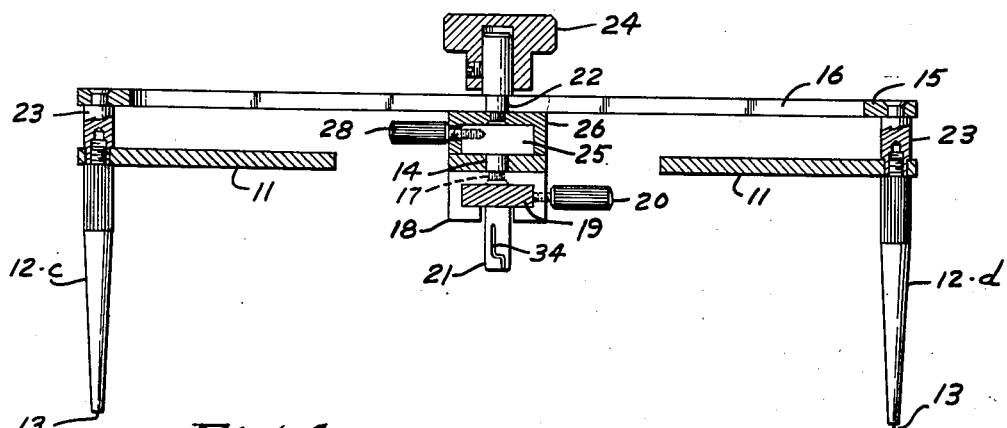
Fig. 4.
INVENTOR.
BERNARD SILVERSTEIN
BY
ATTORNEY.

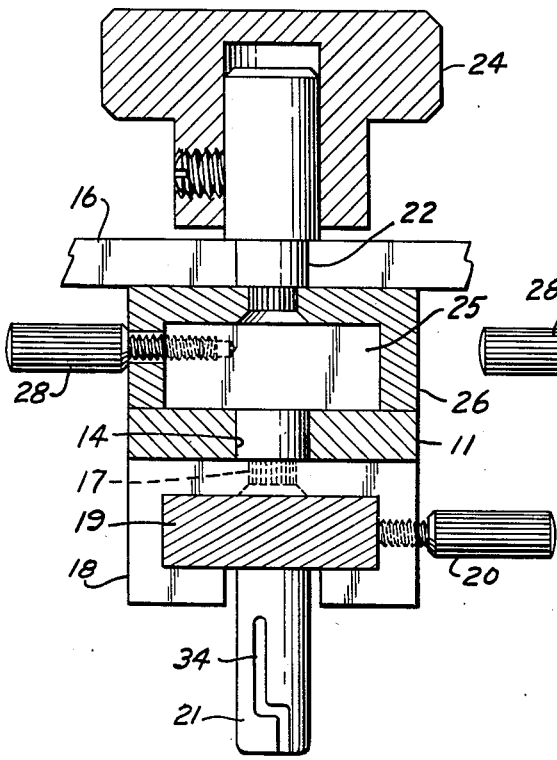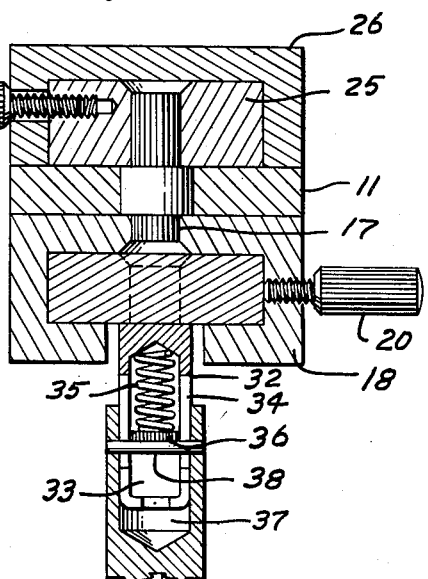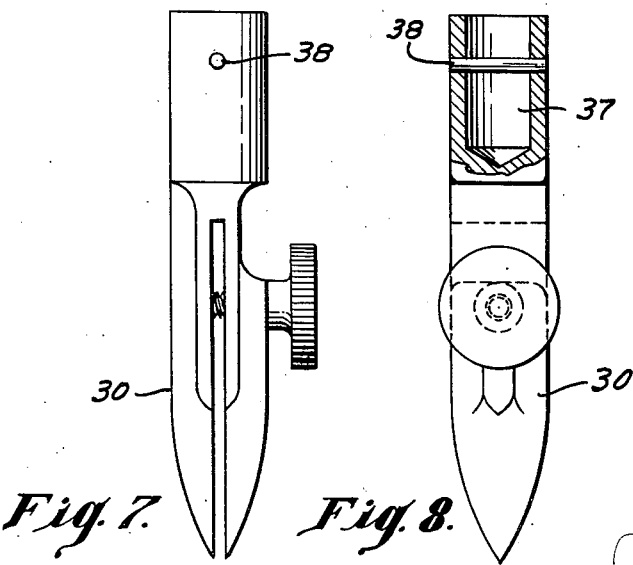

United States Patent Office 2,790,240
Patented Apr. 30, 1957

2,790,240

DRAFTING INSTRUMENT

Bernard Silverstein, Philadelphia, Pa.

Application February 12, 1954, Serial No. 409,811

5 Claims. (Cl. 33—31)

This invention relates to a drafting instrument, and more particularly to a drafting instrument for drawing circles and true ellipses.

This invention has as an object the provision of a light drafting instrument capable of drawing circles, and true ellipses of any relatively proportioned major and minor axis without any limitations in fullness or shallowness of any ellipse and with such circles and ellipses limited in overall size only by the size of the instrument.

A further object of this invention is the provision of a drafting instrument for drawing circles and true ellipses which can be easily and accurately positioned in respect to the location of the desired circle or ellipse on the drawing surface and which can accurately scribe the desired circle or ellipse onto the drawing surface.

A still further object of this invention is the provision of a drafting instrument for drawing circles and true ellipses in which the instrument will compensate for irregularities in the drawing surface beneath the writing point carried by the instrument.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the following figures like reference characters refer to like parts:

Figure 3 is a top plan view of the instrument of Figure 1.

Figure 4 is a section taken on line 4—4 of Figure 2, without scriber attachments.

Figure 5 is an enlarged view of the center portion of Figure 4.

Figure 6 is a section on line 6—6 of Figure 2.

Figure 7 is a fragmentary elevational view of an ink-scriber.

Figure 8 is a view of the ink-scriber of Figure 7, partly in section.

Figure 1:
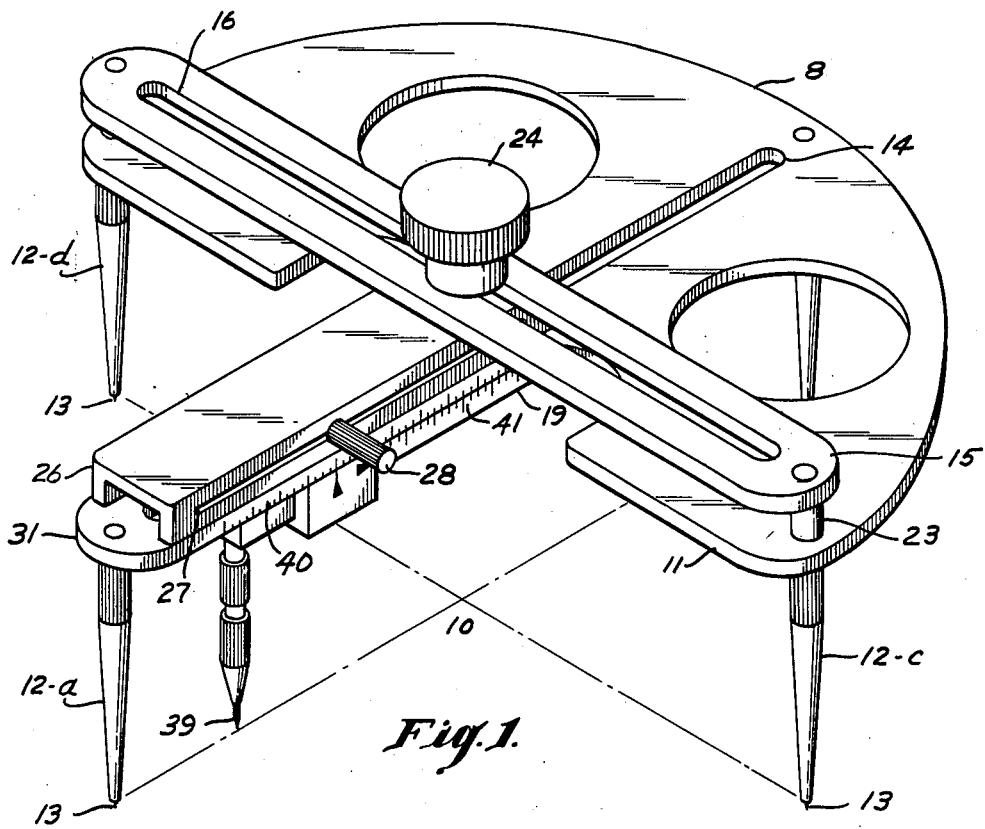
Figure 1 is a perspective view of one embodiment of the instrument of my invention.

Referring to the drawings, the drafting instrument 8 of my invention includes a metal frame or table designated 11 of steel or the like supported on four support legs 12a, 12b, 12c and 12d of brass or the like. Support legs 12a, 12b, 12c and 12d maintain frame or table 11 disposed parallel to the drawing surface 10. Legs 12a and 12b have upwardly-extending threaded projections which are received in table 11, and legs 12c and 12d have upwardly-extending threaded projections which are received in spacer 23 (as more fully explained below). Compensation for a slight irregularity in the drawing surface 10 can be made by a slight unscrewing of one or more of the legs 12a, 12b, 12c and 12d. Each of support legs 12a, 12b, 12c and 12d is provided with an axially-depending fine-pointed anchorage pin 13 for fixedly securing the instrument 8 to the drawing surface 10.

The legs 12a, 12b, 12c and 12d are so spaced that the lines between opposed pin points are at right angles to each other. Thus, the line between the pins 13 carried by legs 12a and 12b and the line between the pins 13 carried by legs 12c and 12d comprise two intersecting axes at right angles to each other.

Figure 2:
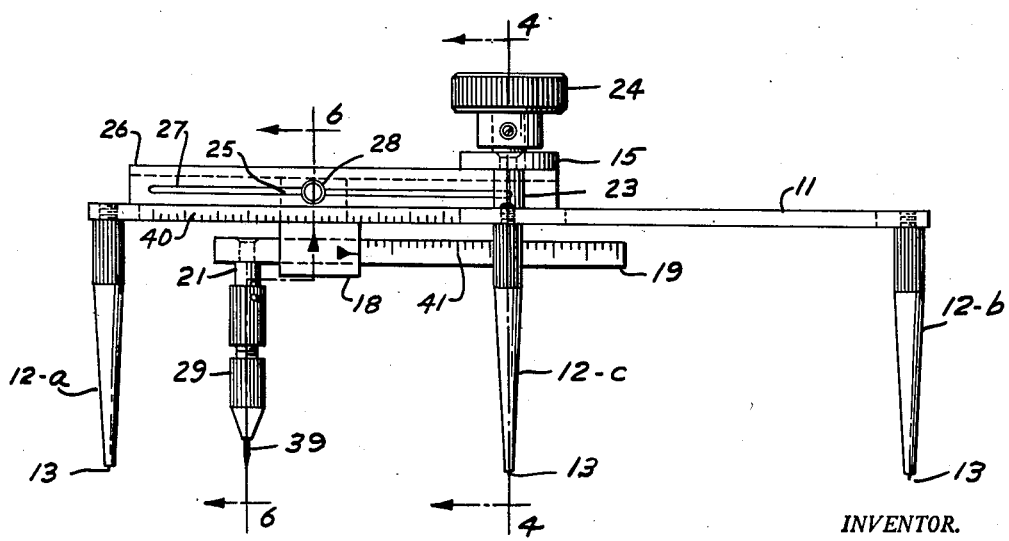
Figure 2 is a side elevational view of the instrument of Figure 1.

The frame 11 of instrument 9 shown in Figures 1 through 6 comprises a generally semi-circular portion 8 and a centrally positioned peninsular extension 31.

A slot 14 extends across the frame 11 with its center axis disposed on the line between the pins 13 carried by legs 12a and 12b.

An elongated plate 15 is superimposed upon table 11 and is spaced above it at a fixed distance. Plate 15 is parallel to frame 11 and is retained in such parallel spaced relationship by spacers 23 which are first attached rigidly to plate 15 by riveting or other means and then firmly attached to table 11 by a press fit or other means. The upwardly-extending threaded projections of legs 12c and 12d are received in threaded openings in the end portion of spacers 23.

Plate 15 is provided with a slot 16 having generally the same axial length and radial width as slot 14. Slot 16 is disposed so that its center axis lies on the line between pins 13 which depend from legs 12c and 12d. Thus, the horizontal and vertical axis of instrument 9 passes through the center of slots 14 and 16 at the point-of-intersection between the line between pins 13 on legs 12a and 12b and the line between pins 13 on legs 12c and 12d.

The operating knob 24 of the instrument, which may be of plastic or metal and knurled or shaped for finger gripping, is provided with a depending pivot pin 22 which extends through the slot 16 in plate 15. The bottom portion of pivot pin 22 is knurled and is fixedly and non-rotatably mounted in the control web of a channel-shaped or inverted U-shaped connecting arm 26, with the lowermost end peened so as to provide a rigid fit. Pivot pin 22 is mounted at one end of the connecting arm 26.

A sliding block 25 is slidably mounted within channel-shaped connecting arm 26. One of the legs of channel-shaped connecting arm 26 is slotted throughout almost its entire length to form screw-receiving slot 27. A locking set screw 28 having a large knurled or grooved head is inserted through slot 27 into an aligned threaded opening in the side of sliding block 25. Frictional engagement between the head of set screw 28 and the outer wall surface of the leg of U-shaped connecting arm 26 adjacent slot 27 permits sliding block 25 to be locked in varying positions extending from a position immediately below cylindrical pivot pin 22 to a position remote from pivot pin 22.

A bowed annular slack-absorbing leaf spring (not shown) may be interposed between the top of frame 11 and the bottom of sliding block 25 within the channel-shaped connecting arm 26. If desired, by accurate machining the slack can be reduced to an insignificant minimum and this bowed annular slack absorbing leaf can be eliminated.

A pivot pin 17, having peened upper and lower ends, whose upper knurled portion is non-rotatably anchored in sliding block 25, depends therefrom through slot 14 in frame 11 and is fixedly and non-rotatably joined by means of its lower knurled portion to the central web of C-shaped scriber arm holder 18, which is carried beneath frame 11. Scriber arm 19 is slidably carried in the channel of C-shaped arm holder 18 in a plane parallel to the plane of frame 11 and plate 15. Leaf springs (not shown) may be disposed on the underside of scriber arm 19 to take up any slack between scriber arm holder 18 and scriber arm 19. However, scriber arm holder 18 may be machined so that the fitting of scriber arm 19 therewithin avoids the necessity of such leaf springs.

Scriber arm 19 is slidably movable in respect to C-shaped arm holder 18 in a path parallel to the plane of movement of sliding block 25 and also parallel to the plane of frame 11 and plate 15 and parallel to the plane of drawing surface 10. One of the legs of C-shaped arm holder 18 is pierced with a threaded opening into which set screw 20 is inserted. Set screw 20 locks scriber arm 19 in holder 18 in any desired scriber arm position.

Scriber arm 19 carries a perpendicularly depending scriber holder 21 adapted to retain a writing point which may be either a pencil point attachment 29 or in the case where inked figures are required, a pen point attachment 30. Scriber holder 21 includes an arm 32 fixedly depending from scriber arm 19 which contains a hollow cylinder 33. The outside wall of cylinder 33 is slotted to provide opposed bayonet slots 34. A coil spring 35 is contained in the hollow cylinder 33 by a disk 36 which in turn is retained by the turned-in lip of the hollow cylinder 33. The opposed bayonet slots 34 are carried over in this turned-in lip. In the pencil point attachment 29 or pen point attachment 30 there is a deep hole or cavity 37 bridged near the top by a pin 38. To attach either pencil point attachment 29 or pen point attachment 30, pin 38 is engaged in bayonet slots 34 and pushed upwardly. A slight twisting motion places the pin 38 of the pencil attachment 29 or pen attachment 30 in the operating position of the bayonet slots 34. When in this position disk 36 has been forced upward compressing coil spring 35 which exerts through the disk 36 and pin 38 a downward pressure on the pencil or pen attachment. The removal of pencil attachment 29 or pen attachment 30 is effected by a converse twisting movement.

The downward spring-urging of the writing point permits compensating for irregularities in the drawing surface in the region of the drawn figure. Thus, if there is a slight crest or protrusion on the drawing surface, the writing point will ride above the drawing surface and not into it. Moreover, if there is a groove, pit or other slight depression in the drawing surface, the point will remain in contact with the surface. The spring pressure exerted by coil spring 35 is insufficient to urge the point 39 into the drawing material on the drawing surface 10.

An additional function of the compensating spring loaded holder is that the pen or pencil point attachment can be lifted from the drawing surface after the circle or ellipse is completed and before the instrument is removed to prevent smearing of the line. This is particularly useful if ink is used.

A scale 40 may be provided along the edge of peninsular extension 31 of table 11 with its zero mark at the center of the table. The distance between the juncture of the pivot pin 22 in the web of connecting arm 26 and the pivot pin 17 which depends from sliding block 25 may be ascertained when connecting arm 26 is positioned above peninsular extension 31 as in Figure 3. A second scale 41 may be provided on the side of scriber arm 19 and may be read against an edge of arm holder 18.

For compact packaging when not in use legs 12a, 12b, 12c and 12d and scriber arm 19 may be removed from instrument 8.

The operation of the instrument of my invention is as follows.

One-half the difference between the length of the major axis and minor axis is set on scale 40 by loosening screw 28 and sliding block 25 into the scale indication desired. Screw 28 is then tightened locking block 25 in position. This movement has displaced pivot pin 17 in slot 14 from pivot pin 22 in slot 16 by one-half the difference between the length of the major and minor axes. Since slot 14 and slot 16 are not contained in the same frame-member, pivot pin 17 can approach and pass under pivot pin 22. This arrangement removes any limitations to size of ellipses and does not limit the fullness or shallowness of any ellipse. With this arrangement circles can also be constructed since pivot pin 17 can be set under pivot pin 22 making the difference between major and minor axis zero. After the above setting is completed, one-half of the length of the minor axis is set on scale 41 by loosening screw 20 and moving scriber arm 19 to the desired scale indication. For circles this movement will be equivalent to one-half the diameter or radius. After the scriber arm 19 is locked in the desired position, the instrument is placed upon the drawing surface with pins 13 of legs 12a and 12b positioned on the major axis and pins 13 of legs 12c and 12d positioned on the minor axis of the desired ellipse. With the legs of the instrument set in the correct position, the angular location of the scriber arm 19 is no longer important. By rotating knob 24 through a complete revolution, the scriber arm 19 carrying the pencil or pen point attachment, will scribe the desired ellipse or circle. Rotating knob 24 will also cause it to move along slot 16. After the ellipse or circle has been completed, the pencil or pen attachment can be lifted and the instrument removed.

The present invention may be embodied in other specific forms without departing from the spirit or essential attributes thereof, and it is therefor desired that the present embodiments be considered in all respects as illustrative and not restrictive, reference being had to the appended claims rather than to the foregoing description to indicate the scope of the invention.

Having described my invention, I claim:

1. A drafting instrument for drawing circles and true ellipses including a slotted frame, a slotted plate vertically spaced above and parallel to said frame, the slots in said frame and plate being at right angles to each other and crossing each other in their medial portion, support legs for maintaining said plate and frame at a spaced distance above and parallel to the drawing surface, said support legs comprising a pair of support legs depending from said frame, each leg adjacent an end of the slot in said frame and disposed on the axial line of said slot, and a pair of support legs depending from said plate, each leg of said second pair adjacent an end of the slot in said plate and disposed on the axial line of said slot, a channel-shaped connecting arm disposed in the space intermediate said frame and plate with the web portion of the channel connecting arm uppermost, handle means comprising a pivot extending through the slot in said plate into the web of said connecting arm and fixedly joined with the web of said connecting arm, a block rectilinearly slidable within the connecting arm, and guided by the legs thereof, between a position below said handle means pivot and a position remote therefrom, a slot in one of the legs of the connecting arm, a projection extending from said block through said slot, frictional locking means carried on said projection for locking said block in varying positions in respect to said handle means by engagement with the outside surface of the slotted leg of the connecting arm, a pivot depending from said block through the slot in the frame, a channel-shaped scriber arm holder carried by said pivot beneath said frame, a scriber arm rectilinearly adjustable in said holder in a plane parallel to the plane of said frame, frictional locking means for fixedly retaining said scriber arm in a predetermined position in said holder, and a scriber holder depending from said scriber arm.

2. A drafting instrument for drawing circles and true ellipses including a slotted frame, a slotted plate vertically spaced above and parallel to said frame, the slots in said frame and plate being at right angles to each other and crossing each other in their medial portion, support legs for maintaining said plate and frame at a spaced distance above and parallel to the drawing surface, said support legs comprising a pair of support legs depending from said frame, each leg adjacent an end of the slot in said frame and disposed on the axial line of said slot, and a pair of support legs depending from said plate, each leg of said second pair adjacent an end of the slot in said plate and disposed on the axial line of said slot, a channel-shaped connecting arm disposed in the space intermediate said frame and plate with the web portion of the channel connecting arm uppermost, handle means comprising a pivot extending through the slot in said plate into the web of said connecting arm and fixedly joined with the web of said connecting arm, a block rectilinearly slidable within the connecting arm, and guided by the legs thereof, between a position below said handle means pivot and a position remote therefrom, a slot in one of the legs of the connecting arm, a projection extending from said block through said slot, frictional locking means carried on said projection for locking said block in varying positions in respect to said handle means by engagement with the outside surface of the slotted leg of the connecting arm, a pivot depending from said block through the slot in the frame, a channel-shaped scriber arm holder carried by said pivot beneath said frame, a scriber arm rectilinearly adjustable in said holder in a plane parallel to the plane of said frame, frictional locking means for fixedly retaining said scriber arm in a predetermined position in said holder, and a scriber holder depending from said scriber arm, said scriber holder including spring-urged writing point retention means whereby a writing point carried in said scriber holder is spring-urged downwardly and adjusts to irregularities on the drawing surface to which it is applied.

3. A drafting instrument for drawing circles and true ellipses including a slotted frame, a slotted plate vertically spaced above and parallel to said frame, the slots in said frame and plate being at right angles to each other and crossing each other in their medial portion, support legs for maintaining said plate and frame at a spaced distance above and parallel to the drawing surface, said support legs comprising a pair of support legs depending from said frame, each leg adjacent an end of the slot in said frame and disposed on the axial line of said slot, and a pair of support legs depending from said plate, each leg of said second pair adjacent an end of the slot in said plate and disposed on the axial line of said slot, said support legs depending from said plate passing through said frame, a spacer disposed on said legs intermediate said frame and plate for maintaining said plate at a fixed uniform distance above said frame, a channel-shaped connecting arm disposed in the space intermediate said frame and plate with the web portion of the channel connecting arm uppermost, handle means comprising a pivot extending through the slot in said plate into the web of said connecting arm and fixedly joined with the web of said connecting arm, a block rectilinearly slidable within the connecting arm, and guided by the legs thereof, between a position below said handle means pivot and a position remote therefrom, a slot in one of the legs of the connecting arm, a projection extending from said block through said slot, frictional locking means carried on said projection for locking said block in varying positions in respect to said handle means by engagement with the outside surface of the slotted leg of the connecting arm, a pivot depending from said block through the slot in the frame, a channel-shaped scriber arm holder carried by said pivot beneath said frame, a scriber arm rectilinearly adjustable in said holder in a plane parallel to the plane of said frame, frictional locking means for fixedly retaining said scriber arm in a predetermined position in said holder, and a scriber holder depending from said scriber arm.

4. A drafting instrument for drawing circles and true ellipses including a slotted frame, a slotted plate vertically spaced above and parallel to said frame, the slots in said frame and plate being at right angles to each other and crossing each other in their medial portion, support legs for maintaining said plate and frame at a spaced distance above and parallel to the drawing surface, said support legs comprising a pair of support legs depending from said frame, each leg adjacent an end of the slot in said frame and disposed on the axial line of said slot, and a pair of support legs depending from said plate, each leg of said second pair adjacent an end of the slot in said plate and disposed on the axial line of said slot, a channel-shaped connecting arm disposed in the space intermediate said frame and plate with the web portion of the channel connecting arm uppermost, handle means comprising a pivot extending through the slot in said plate into the web of said connecting arm and fixedly joined with the web of said connecting arm, a block rectilinearly slidable within the connecting arm, and guided by the legs thereof, between a position below said handle means pivot and a position remote therefrom, a slot in one of the legs of the connecting arm, a projection extending from said block through said slot, frictional locking means carried on said projection for locking said block in varying positions in respect to said handle means by engagement with the outside surface of the slotted leg of the connecting arm, a pivot depending from said block through the slot in the frame, a channel-shaped scriber arm holder carried by said pivot beneath said frame, a scriber arm rectilinearly adjustable in said holder in a plane parallel to the plane of said frame, frictional locking means for fixedly retaining said scriber arm in a predetermined position in said holder, and a scriber holder depending from said scriber arm, a portion of the frame being cut away to provide ready access to the scriber arm holder and connecting arm.

5. A drafting instrument for drawing circles and true ellipses including a slotted frame, a slotted plate vertically spaced above and parallel to said frame, the slots in said frame and plate being at right angles to each other and crossing each other in their medial portion, support legs for maintaining said plate and frame at a spaced distance above and parallel to the drawing surface, said support legs comprising a pair of support legs depending from said frame, each leg adjacent an end of the slot in said frame and disposed on the axial line of said slot, and a pair of support legs depending from said plate, each leg of said second pair adjacent an end of the slot in said plate and disposed on the axial line of said slot, a channel-shaped connecting arm disposed in the space intermediate said frame and plate with the web portion of the channel connecting arm uppermost, handle means comprising a pivot extending through the slot in said plate into the web of said connecting arm and fixedly joined with the web of said connecting arm, a block rectilinearly slidable within the connecting arm, and guided by the legs thereof, between a position below said handle means pivot and a position remote therefrom, a slot in one of the legs of the connecting arm, a projection extending from said block through said slot, frictional locking means carried on said projection for locking said block in varying positions in respect to said handle means by engagement with the outside surface of the slotted leg of the connecting arm, a pivot depending from said block through the slot in the frame, a channel-shaped scriber arm holder carried by said pivot beneath said frame, a scriber arm rectilinearly adjustable in said holder in a plane parallel to the plane of said frame, frictional locking means for fixedly retaining said scriber arm in a predetermined position in said holder, and a scriber holder depending from said scriber arm, a portion of the frame being cut away to provide ready access to the scriber arm holder and connecting arm so that the portion of the frame adjacent about one half of the slot in the frame comprises a peninsula.

(References on following page)

References Cited in the file of this patent

UNITED STATES PATENTS

| | | |
|---|---|---|
| 595,524 | Clough | Dec. 14, 1897 |
| 830,784 | Hanes et al. | Sept. 11, 1906 |
| 1,017,287 | Gran et al. | Feb. 13, 1912 |
| 2,082,065 | Knackert | June 1, 1932 |

FOREIGN PATENTS

| | | |
|---|---|---|
| 586,022 | Germany | Oct. 14, 1933 |
| 162,285 | Austria | Feb. 10, 1949 |

OTHER REFERENCES

Knott publication, "Ellipsograph," Engineering magazine, London, vol. 39, page 221, February 27, 1885.